(12) United States Patent
Liu et al.

(10) Patent No.: US 8,369,560 B2
(45) Date of Patent: *Feb. 5, 2013

(54) DAMPER AND LOUDSPEAKER USING THE SAME

(75) Inventors: Liang Liu, Beijing (CN); Jia-Ping Wang, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 316 days.

This patent is subject to a terminal disclaimer.

(21) Appl. No.: 12/824,384

(22) Filed: Jun. 28, 2010

(65) Prior Publication Data

US 2011/0069860 A1    Mar. 24, 2011

(30) Foreign Application Priority Data

Sep. 18, 2009   (CN) .......................... 2009 1 0190386

(51) Int. Cl.
*H04R 1/02* (2006.01)

(52) U.S. Cl. .......................... 381/394; 977/742; 977/949

(58) Field of Classification Search .................. 977/742, 977/902, 949; 381/394, 423
See application file for complete search history.

(56) References Cited

U.S. PATENT DOCUMENTS

| | | | |
|---|---|---|---|
| 4,312,118 A | 1/1982 | Saik et al. | |
| 6,597,798 B1 * | 7/2003 | Nakazono et al. | 381/410 |
| 6,639,993 B2 * | 10/2003 | Kemmerer et al. | 381/397 |
| 6,808,746 B1 | 10/2004 | Dai et al. | |
| 8,068,626 B2 * | 11/2011 | Jiang et al. | 381/164 |
| 8,073,164 B2 * | 12/2011 | Jiang et al. | 381/164 |
| 2004/0020681 A1 | 2/2004 | Hjortstam et al. | |
| 2004/0053780 A1 | 3/2004 | Jiang et al. | |
| 2008/0248235 A1 | 10/2008 | Feng et al. | |
| 2008/0260188 A1 * | 10/2008 | Kim | 381/190 |
| 2008/0304694 A1 | 12/2008 | Hayashi | |
| 2009/0045005 A1 * | 2/2009 | Byon et al. | 181/167 |
| 2009/0068448 A1 | 3/2009 | Liu et al. | |
| 2009/0074228 A1 | 3/2009 | Mango, III et al. | |
| 2009/0153502 A1 | 6/2009 | Jiang et al. | |
| 2009/0155467 A1 | 6/2009 | Wang et al. | |
| 2009/0160799 A1 | 6/2009 | Jiang et al. | |
| 2009/0197082 A1 | 8/2009 | Jiang et al. | |
| 2009/0268559 A1 * | 10/2009 | Jiang et al. | 367/140 |
| 2009/0272935 A1 | 11/2009 | Hata et al. | |

(Continued)

FOREIGN PATENT DOCUMENTS

| | | |
|---|---|---|
| CN | 2488247 | 4/2002 |
| CN | 1430785 | 7/2003 |

(Continued)

OTHER PUBLICATIONS

"Flexible, Stretchable, Transparent Carbon Nanotube Thin Film Loudspeakers" Lin Xiao et al., Nano Letters, Oct. 29, 2008.*

(Continued)

*Primary Examiner* — Jeffrey Donels
(74) *Attorney, Agent, or Firm* — Altis Law Group, Inc.

(57) ABSTRACT

The present disclosure provides a damper. The damper has alternating ridges and furrows thereon and has a through hole defined at a center of the damper. The ridges and furrows are concentric. The damper includes a matrix and at least one carbon nanotube structure disposed in the matrix. The present disclosure also provides a loudspeaker using the damper.

20 Claims, 7 Drawing Sheets

U.S. PATENT DOCUMENTS

| | | | | |
|---|---|---|---|---|
| 2009/0296528 | A1* | 12/2009 | Jiang et al. | 367/140 |
| 2010/0046784 | A1* | 2/2010 | Jiang et al. | 381/386 |
| 2010/0188934 | A1* | 7/2010 | Qian et al. | 367/140 |

FOREIGN PATENT DOCUMENTS

| | | |
|---|---|---|
| CN | 1640923 | 7/2005 |
| CN | 101239712 | 8/2008 |
| CN | 101288336 | 10/2008 |
| CN | 101321410 | 12/2008 |
| CN | 101381071 | 3/2009 |
| CN | 101464759 | 6/2009 |
| JP | 60-27298 | 2/1985 |
| JP | 63-49991 | 12/1988 |
| JP | 7-138838 | 5/1995 |
| JP | 2002-171593 | 6/2002 |
| JP | 2002-542136 | 12/2002 |
| JP | 2003-319490 | 11/2003 |
| JP | 2004-32425 | 1/2004 |
| JP | 2004-107196 | 4/2004 |
| JP | 2006-147801 | 6/2006 |
| JP | 2007-182352 | 7/2007 |
| JP | 2007-290908 | 11/2007 |
| JP | 2009-144158 | 7/2009 |
| JP | 2009-146420 | 7/2009 |
| JP | 2009-184910 | 8/2009 |

OTHER PUBLICATIONS

"Nanotubes made of carbon find an unexpected use" The Economist, Nov. 20, 2008.*

"Hot nanotube sheets produce music on demand" New Scientist, Oct. 31, 2008.*

Xiao et al.,Flexible, Stretchable, Transparent Carbon Nanotube Thin Film Loudspeakers,Nanoletter, vol. 8; No. 12, 4539-4545.

* cited by examiner

DAMPER AND LOUDSPEAKER USING THE SAME

CROSS-REFERENCE TO RELATED APPLICATIONS

This application claims all benefits accruing under 35 U.S.C. §119 from China Patent Application No. 200910190386.6, filed on Sep. 18, 2009, in the China Intellectual Property Office, the contents of which are hereby incorporated by reference. This application is related to commonly-assigned application entitled, "DAMPER AND LOUDSPEAKER USING THE SAME", filed (Jun. 28, 2010 (U.S. Ser. No. 12/824,399).

BACKGROUND

1. Technical Field

The present disclosure relates to a damper based on carbon nanotubes, and a loudspeaker using the same.

2. Description of Related Art

A loudspeaker is an acoustic device transforming received electric signals into sounds. The electric signals have enough power to make the sounds audible to humans. There are different types of loudspeakers that can be categorized by their working principle, such as electro-dynamic loudspeakers, electromagnetic loudspeakers, electrostatic loudspeakers and piezoelectric loudspeakers. Among the various types, electro-dynamic loudspeakers have simple structures, good sound quality, and low cost, thus it is most widely used.

Electro-dynamic loudspeakers typically include a diaphragm, a bobbin, a voice coil, a damper, a magnet, and a frame. The voice coil is an electrical conductor, and is placed in the magnetic field of the magnet. By applying an electrical current to the voice coil, a mechanical vibration of the diaphragm is produced due to the interaction between the electromagnetic field produced by the voice coil and the magnetic field of the magnets to produce sound waves.

To evaluate the loudspeaker, a sound volume is a decisive factor. The sound volume of the loudspeaker relates to the input power of the electric signals and the conversion efficiency of the energy (e.g., the conversion efficiency of the electrical to sound). The larger the input power, the larger the conversion efficiency of the energy and sound volume of the loudspeaker. However, when the input power is increased to certain levels, the damper and diaphragm could deform or even break, thereby causing audible distortion. Therefore, the strength of the elements in the loudspeaker affect a rated power of the loudspeaker. The rated power is the highest input power the loudspeaker can produce sound without the audible distortion. Additionally, the lighter the weight of the elements in the loudspeaker, such as the weight of the damper and the weight per unit area of the diaphragm, the smaller the energy required for vibrating the diaphragm, and the higher the energy conversion efficiency of the loudspeaker, and sound volume produced by the same input power. Thus, the strength and the weight of the damper are important factors affecting the sound volume of the loudspeaker. The weight of the damper is related to a thickness and a density thereof. Accordingly, the higher the specific strength (e.g., strength-to-density ratio), the thinner the damper of the loudspeaker, and the higher the sound volume of the loudspeaker.

However, in prior art, the damper is usually made of pure cotton or blended fabric. The rated power of conventional loudspeakers is difficult to increase because of the conventional material of the damper. In general, the rated power of a small sized loudspeaker is only 0.3 watt (W) to 0.5 W. A larger bobbin thickness to achieve a larger specific strength, results in a greater damper weight. Thereby, it is hard to improve the energy conversion efficiency of the loudspeaker. Therefore, to increase the rated power and the energy conversion efficiency of the loudspeaker and to increase sound volume, the improvement of the loudspeaker is focusing on increasing the specific strength and the decreasing of the weight of the damper.

What is needed, therefore, is a damper with high specific strength and light weight and a loudspeaker using the same.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
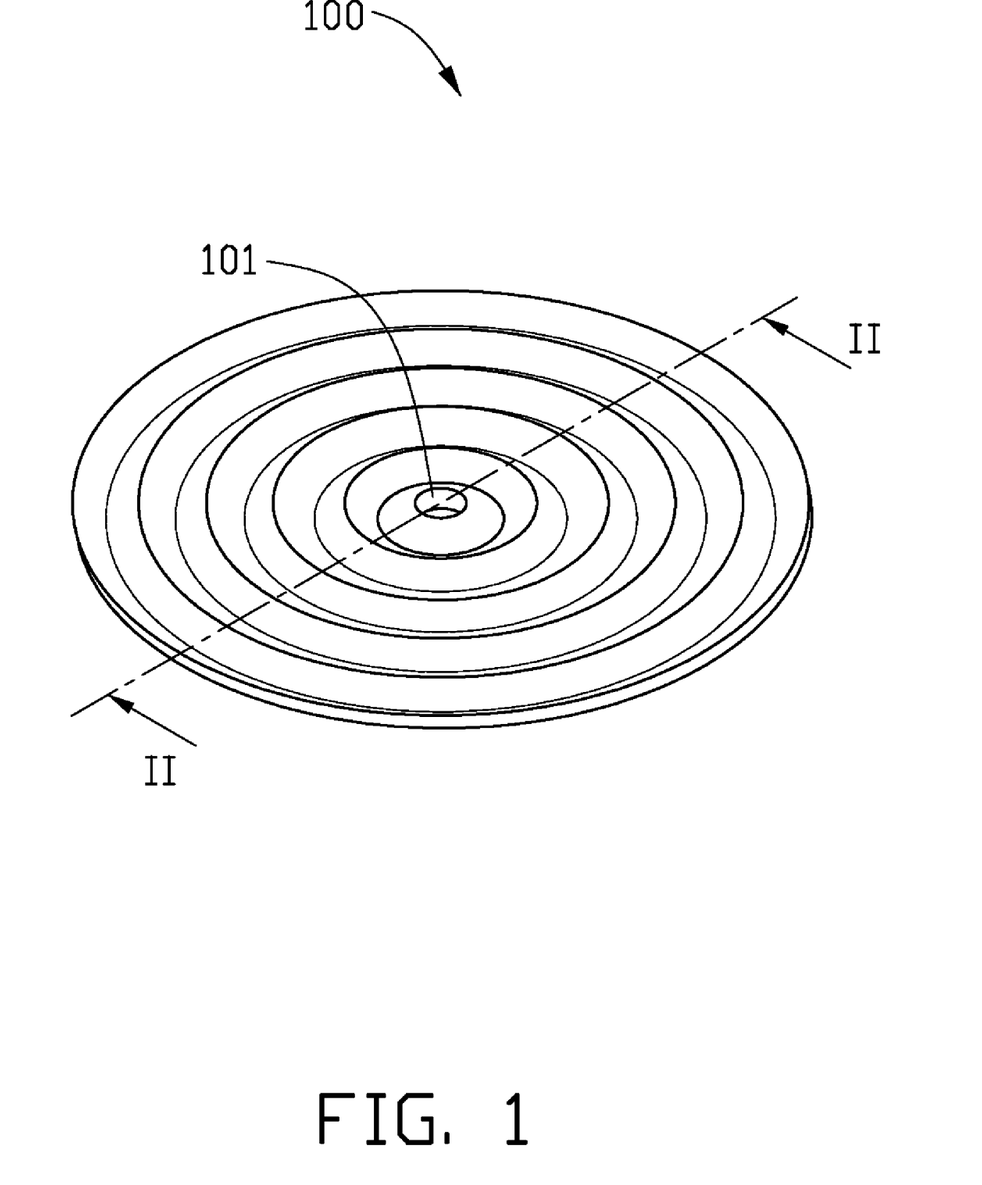
FIG. 1 is an isometric view of a first embodiment of a damper.
Figure 2:
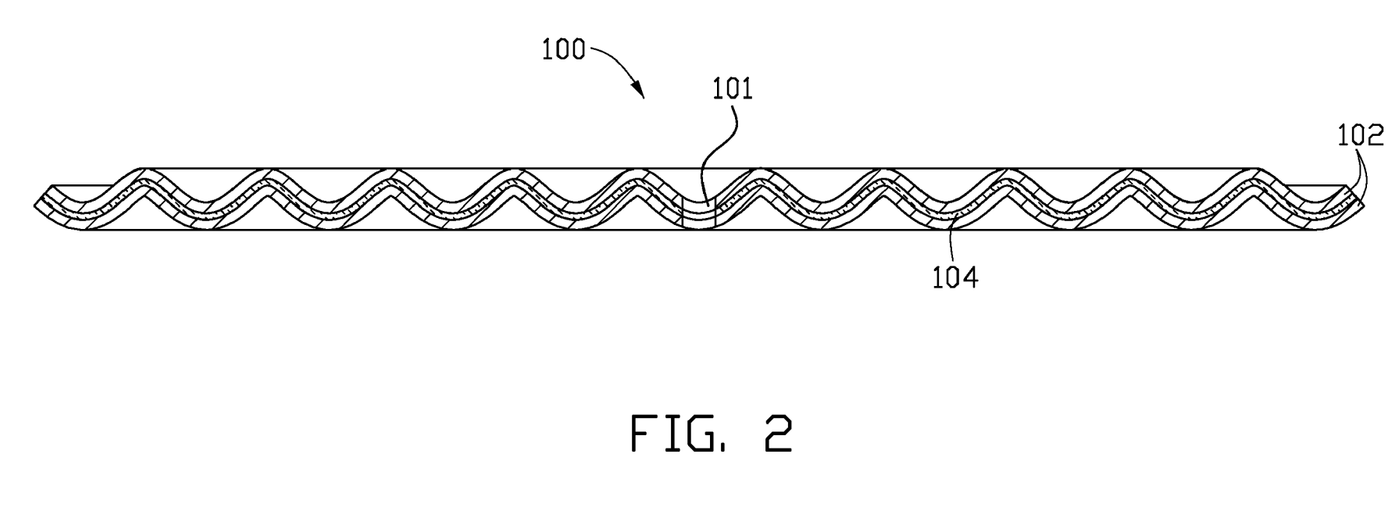
FIG. 2 is a cross-sectional view of the damper of FIG. 1, taken along line II-II.
Figure 3:
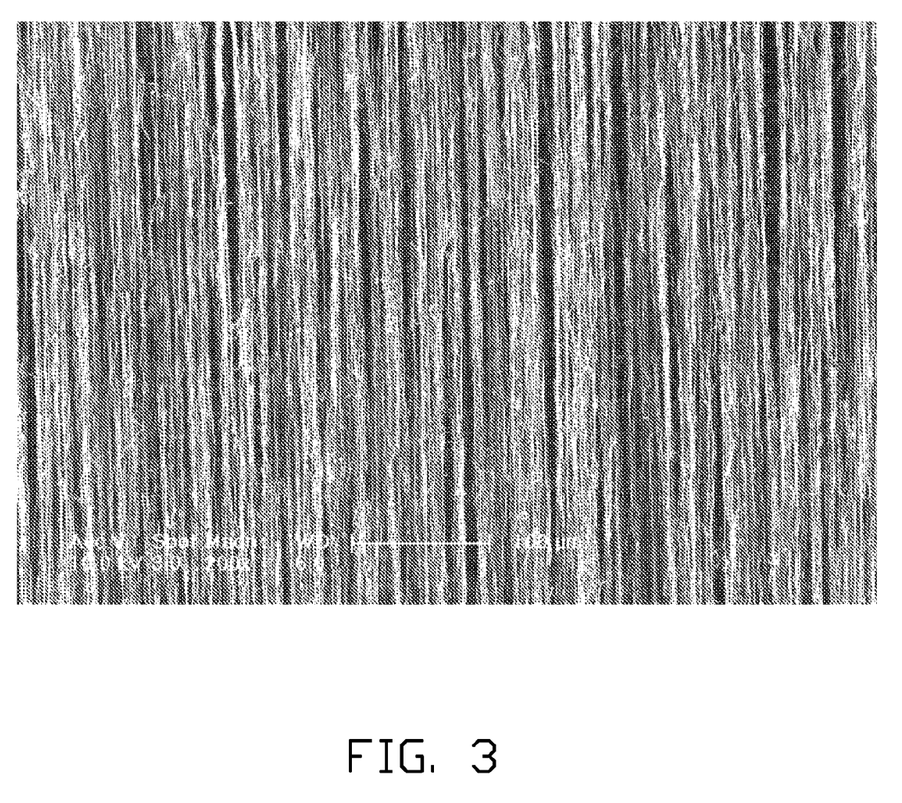
FIG. 3 is a Scanning Electron Microscope (SEM) image of a drawn carbon nanotube film of the damper of FIG. 1.

Referring to FIGS. 1, 2 and 3, a damper 100 of a first embodiment is illustrated. A shape and a size of the damper 100 can be selected according to need.

The damper 100 can be corrugated with a plurality of ridges and furrows (not labeled) defined in the damper 100. The ridges and the furrows can be concentric. In the present embodiment, the damper 100 is a corrugated round sheet having alternating circular ridges and furrows. The thickness of the damper 100 can be about 1 micrometer to about 2 millimeters. A through hole 101 can be defined at a center of the round sheet. A size and shape of the through hole 101 correspond to a size and shape of a bobbin of a loudspeaker using the damper 100. When the bobbin and the damper 100 are assembled together, the bobbin can easily extend through the through hole 101 of the damper 100. The damper 100 can be made by a hot pressing method.

A plurality of wires (not shown) can be fixed on a surface of the damper 100 by adhesive. The wires can be used to supply a current to a voice coil of the loudspeaker using the damper 100. A tensile force produced during a mechanical vibration of the damper 100 can be alleviated to prevent the wires and the voice coil from breaking connection.

The damper 100 includes at least one carbon nanotube structure 104 and a matrix 102. The carbon nanotube structures 104 can be located in the matrix 102. The matrix 102 and the at least one carbon nanotube structure 104 comprises a composite structure. The carbon nanotube structure 104 can be layer-shaped. If the damper 100 includes a plurality of carbon nanotube structures 104 and a matrix 102, the plurality of the carbon nanotube structures 104 can be stacked or spaced apart from each other. The matrix 102 can be a polymer film, a paper, a metal film, or metal sheet. For example, the matrix 102 can be a polyimide film, a polyester film, or an aluminum film. In the present embodiment, the damper 100 includes a matrix 102 of polyimide film and only one carbon nanotube structure 104 located therein. The polyimide film has a small density (only 1.35 g/cm$^3$) to lighten and improve a specific strength of the damper 100.

Disposing the carbon nanotube structure 104 into the matrix 102 depends on the material of the matrix 102. In one embodiment, the matrix 102 is a liquid-state polymer, and a method for disposing the carbon nanotube structure 104 into the liquid-state polymer includes:

step (a1): dipping the carbon nanotube structure 104 into the liquid-state polymer bath; and step (b1): removing the carbon nanotube structure 104 from the liquid-state polymer bath after the carbon nanotube structure 104 has been soaked by the liquid-state polymer.

In one embodiment, the matrix 102 is a solid-state polymer, and a method for disposing the carbon nanotube structure 104 into the solid-state polymer includes:

step (a2): covering at least one surface of the carbon nanotube structure 104 with the solid-state polymer;

step (b2): treating the carbon nanotube structure 104 and the solid-state polymer by a hot pressing method to form a composite structure; and step (c2): cooling the composite structure.

In one embodiment, the material of the matrix 102 is a metal deposited on at least one surface of the carbon nanotube structure 104 by physical vapor deposition. The carbon nanotube structure 104 includes a plurality of carbon nanotubes and has a plurality of gaps formed by the carbon nanotubes. Therefore, the matrix 102 can be filled in the gaps or cover the surfaces of the carbon nanotubes of the carbon nanotube structure 104. In the composite structure, the carbon nanotube structure 104 and the matrix 102 are firmly combined together.

If the matrix 102 is a polymer, when disposing the carbon nanotube structure 104 into the matrix 102, the temperature of the matrix 102 is about 20° C. to about 50° C. higher than a glass transition temperature of the matrix 102, and lower than a decomposition temperature of the matrix 102. The pressure applied to the matrix 102 in the hot pressing method, is in a range from about three atmospheric pressures to about ten atmospheric pressures.

The method for making the damper 100 has no restriction. In one embodiment, the composite structure comprising the matrix 102 and the carbon nanotube structure 104 is corrugated to form a damper preform having a plurality of concentric and alternating ridges and furrows, and a through hole 101 is formed in a centre of the damper perform thereafter to obtain the damper 100.

The surfaces of the carbon nanotube structure 104 can be coated by an enhancement layer. The material of the enhancement layer can be metal, diamond, boron carbide, or ceramics. The enhancement layer can improve the bonding force of the matrix 102 and the carbon nanotube structure 104. The material of the enhancement layer is compatible with the material of the matrix 102. The material of the enhancement layer can be the same as the material of the matrix 102. For example, the material of the matrix 102 and the enhancement layer is metal.

In one embodiment, the carbon nanotube structure 104 comprises at least one carbon nanotube film. If the carbon nanotube structure 104 comprises a plurality of carbon nanotube films, the plurality of carbon nanotube films can be stacked. The carbon nanotube film comprises a plurality of carbon nanotubes. The plurality of carbon nanotubes in the carbon nanotube film can be single-walled, double-walled, and/or multi-walled carbon nanotubes. The diameters of the single-walled carbon nanotubes can range from about 0.5 nanometers to about 50 nanometers. The diameters of the double-walled carbon nanotubes can range from about 1 nanometer to about 50 nanometers. The diameters of the multi-walled carbon nanotubes can range from about 1.5 nanometers to about 50 nanometers.

The carbon nanotube film can be a freestanding film. The carbon nanotube film includes a plurality of carbon nanotubes distributed uniformly and attracted by van der Waals attractive force therebetween. The carbon nanotubes in the carbon nanotube film can be orderly or disorderly aligned. The orderly aligned carbon nanotubes are arranged in a consistently systematic manner, e.g., most of the carbon nanotubes are arranged approximately along a same direction or have two or more sections within each of which the most of the carbon nanotubes are arranged approximately along a same direction (different sections can have different directions). The disorderly aligned carbon nanotubes are arranged along many different directions, such that the number of carbon nanotubes arranged along each different direction can be almost the same (e.g. uniformly disordered); and/or entangled with each other. Specifically, the carbon nanotube film can be a drawn carbon nanotube film, a flocculated carbon nanotube film, a pressed carbon nanotube film, or a carbon nanotube film formed by spraying, coating, or deposition.

The drawn film can be drawn from a carbon nanotube array. Examples of the drawn carbon nanotube film are taught by U.S. Pat. No. 7,045,108 to Jiang et al., and WO 2007015710 to Zhang et al. The drawn carbon nanotube film includes a plurality of carbon nanotubes arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction by van der Waals attractive force. The drawn carbon nanotube film is capable of forming a freestanding structure. The successive carbon nanotubes joined end to end by van der Waals attractive force realizes the freestanding structure of the drawn carbon nanotube film. An SEM image of the drawn carbon nanotube film is shown in FIG. 3.

Some variations can occur in the orientation of the carbon nanotubes in the drawn carbon nanotube film. Microscopically, the carbon nanotubes oriented substantially along the same direction may not be perfectly aligned in a straight line, and some curve portions may exist. It can be understood that a contact between some carbon nanotubes located substantially side by side and oriented along the same direction cannot be totally excluded.

More specifically, the drawn carbon nanotube film can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity, and shape. The carbon nanotubes in the drawn carbon nanotube film are also substantially oriented along a preferred orientation. A thickness of the drawn carbon nanotube film can range from about 0.5 nm to about 100 µm. A width of the drawn carbon nanotube film relates to the carbon nanotube array from which the drawn carbon nanotube film is drawn. When the carbon nanotube structure 104 consist of the drawn carbon nanotube film, and a thickness of the carbon nanotube structure 104 can be relatively small (e.g., smaller than 10 µm), the carbon nanotube structure 104 can have a good transparency, and the transmittance of the light can reach about 90%. The transparent carbon nanotube structure 104 can be used to make a transparent damper 100 with the transparent base 102.

The carbon nanotube structure 104 can include at least two stacked drawn carbon nanotube films. An angle between the aligned directions of the carbon nanotubes in two adjacent carbon nanotube films can range from about 0 degrees to about 90 degrees)($0°≦α≦90°$). Spaces are defined between two adjacent and side-by-side carbon nanotubes in the drawn carbon nanotube film. If the angle between the aligned directions of the carbon nanotubes in adjacent carbon nanotube films is larger than 0 degrees, the carbon nanotubes define a microporous structure. The carbon nanotube structure 104 in one embodiment employing these films will define a plurality of micropores. A diameter of the micropores can be smaller than 10 µm. Stacking the carbon nanotube films will add to the structural integrity of the carbon nanotube structure 104.

The flocculated carbon nanotube film can include a plurality of long, curved, disordered carbon nanotubes entangled with each other. A length of the carbon nanotubes can be larger than about 10 µm. In one embodiment, the length of the carbon nanotubes is in a range from about 200 µm to about 900 µm. Further, the flocculated carbon nanotube film can be isotropic. Adjacent carbon nanotubes are acted upon by van der Waals attractive force to obtain an entangled structure with micropores defined therein. The flocculated carbon nanotube film is very porous. The sizes of the micropores can be less than 10 µm. In one embodiment, the sizes of the micropores are in a range from about 1 nm to about 10 µm. Further, because the carbon nanotubes in the carbon nanotube structure 104 are entangled with each other, the carbon nanotube structure 104 employing the flocculated carbon nanotube film has excellent durability, and can be fashioned into desired shapes with a low risk to the integrity of the carbon nanotube structure 104. The flocculated carbon nanotube film is freestanding because the carbon nanotubes are entangled and adhered together by van der Waals attractive force therebetween. The thickness of the flocculated carbon nanotube film can range from about 1 micrometer (µm) to about 1 millimeter (mm). In one embodiment, the thickness of the flocculated carbon nanotube film is about 100 µm.

The pressed carbon nanotube film can be a freestanding carbon nanotube film formed by pressing a carbon nanotube array down on the substrate. The carbon nanotubes in the pressed carbon nanotube film are arranged along a same direction or along different directions. The carbon nanotubes in the pressed carbon nanotube film can rest upon each other. Adjacent carbon nanotubes are attracted to each other and are combined by van der Waals attractive force. An angle between a primary alignment direction of the carbon nanotubes and a surface of the pressed carbon nanotube film is about 0 degrees to about 15 degrees. The greater the pressure applied, the smaller the angle obtained. If the carbon nanotubes in the pressed carbon nanotube film are arranged along different directions, the carbon nanotube structure 104 can be isotropic. Here, "isotropic" means the carbon nanotube film has properties identical in all directions substantially parallel to a surface of the carbon nanotube film. A thickness of the pressed carbon nanotube film ranges from about 0.5 nanometers (nm) to about 1 mm. A length of the carbon nanotubes can be larger than 50 µm. Clearances can exist in the carbon nanotube array, therefore, micropores exist in the pressed carbon nanotube film and are defined by the adjacent carbon nanotubes. An example of pressed carbon nanotube film is taught by US20080299031A1 to Liu et al.

Figure 4:
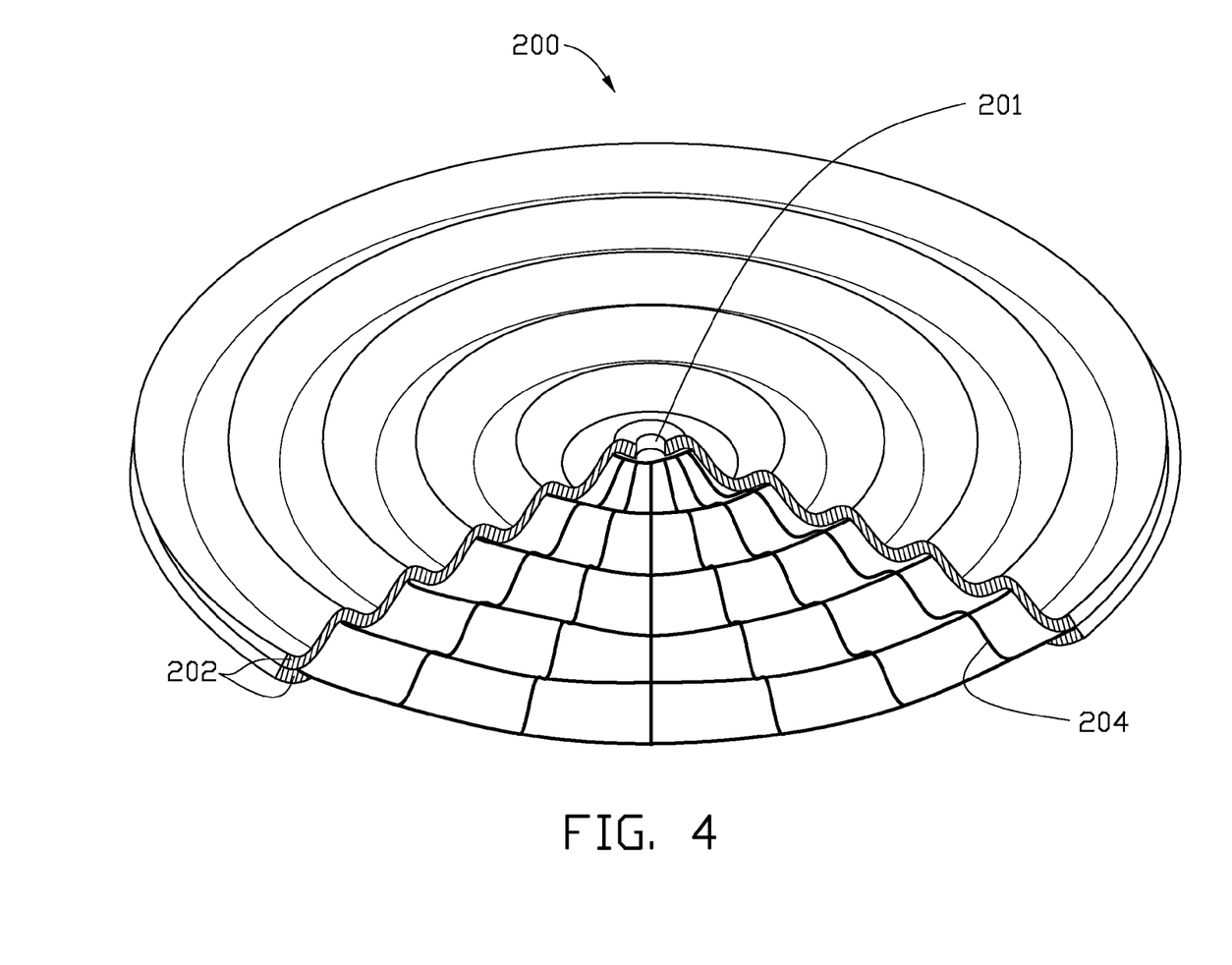
FIG. 4 is a local cross-sectional view of a second embodiment of a damper.

Referring to FIG. 4, a damper 200 of a second embodiment is provided. The damper 200 is a corrugated round sheet having radially alternating concentric circular ridges and circular furrows. The damper 200 has a through hole 201. The damper 200 includes a matrix 202 and a carbon nanotube structure 204 located in the matrix 202.

The structure of the second embodiment of the damper 200 is similar to the structure of the first embodiment of the damper 100, except that the carbon nanotube structure 204 in the damper 200 comprises at least one linear carbon nanotube structure. If the carbon nanotube structure 204 comprises a single linear carbon nanotube structure, the single linear carbon nanotube structure can be folded or can be wound to form a plane structure. If the carbon nanotube structure 204 comprises a plurality of linear carbon nanotube structures, the plurality of linear carbon nanotube structures can be substantially parallel to each other, crossed with each other or woven together to form a plane structure. The plane structure and the matrix 202 comprise a composite structure. Specifically, the plurality of linear carbon nanotube structure can first be formed to a planar shaped structure, and then composited with the matrix 202 by a hot pressing method to form a composite structure.

The linear carbon nanotube structure comprises at least one carbon nanotube wire. The diameter of the carbon nanotube wire is in a range from about 0.5 nanometers to about 1 millimeter. If the linear carbon nanotube structure includes a plurality of carbon nanotube wires, the carbon nanotube wires can be substantially parallel to each other to form a bundle-like structure or twisted with each other to form a twisted structure. The bundle-like structure and the twisted structure are two kinds of linear carbon nanotube structures.

The carbon nanotube wire can be untwisted or twisted. Treating the drawn carbon nanotube film with a volatile organic solvent can obtain the untwisted carbon nanotube wire. In one embodiment, the organic solvent is applied to soak the entire surface of the drawn carbon nanotube film. During the soaking, adjacent substantially parallel carbon nanotubes in the drawn carbon nanotube film will bundle together, due to the surface tension of the organic solvent as it volatilizes, and thus, the drawn carbon nanotube film will be shrunk into an untwisted carbon nanotube wire. The untwisted carbon nanotube wire includes a plurality of carbon nanotubes substantially oriented along a same direction (i.e., a direction along the length direction of the untwisted carbon nanotube wire). The carbon nanotubes are substantially parallel to the axis of the untwisted carbon nanotube wire. In one embodiment, the untwisted carbon nanotube wire includes a plurality of successive carbon nanotubes joined end to end by van der Waals attractive force therebetween. The length of the untwisted carbon nanotube wire can be arbitrarily set as desired. A diameter of the untwisted carbon nanotube wire ranges from about 0.5 nm to about 100 µm. An example of the untwisted carbon nanotube wire is taught by US Patent Application Publication US 2007/0166223 to Jiang et al.

The twisted carbon nanotube wire can be obtained by twisting a drawn carbon nanotube film using a mechanical force to turn the two ends of the drawn carbon nanotube film in opposite directions. The twisted carbon nanotube wire includes a plurality of carbon nanotubes helically oriented around an axial direction of the twisted carbon nanotube wire. In one embodiment, the twisted carbon nanotube wire includes a plurality of successive carbon nanotubes joined end to end by van der Waals attractive force therebetween. The length of the carbon nanotube wire can be set as desired. A diameter of the twisted carbon nanotube wire can range from about 0.5 nm to about 100 μm.

The carbon nanotube structure 204 also can include a carbon nanotube hybrid wire structure (not shown). The carbon nanotube hybrid wire structure can include a bundle-like structure formed by the at least one carbon nanotube wire and at least one base wire substantially parallel to each other, or a twisted structure formed by the at least one carbon nanotube wire and the at least one base wire twisted with each other. The carbon nanotube hybrid structure can include at least one linear carbon nanotube structure and at least one base wire substantially parallel to each other, crossed with each other, or woven together. A material of the base wire can be the same as that of the matrix 202. The base wire can have an excellent specific strength and a low density. Further, the base wire can also have a high temperature resistance property. In one embodiment, the base wire can be resistant to a temperature larger than about 250° C. For example, the base wire can be fiberglass or carbon fibre.

Figure 5:
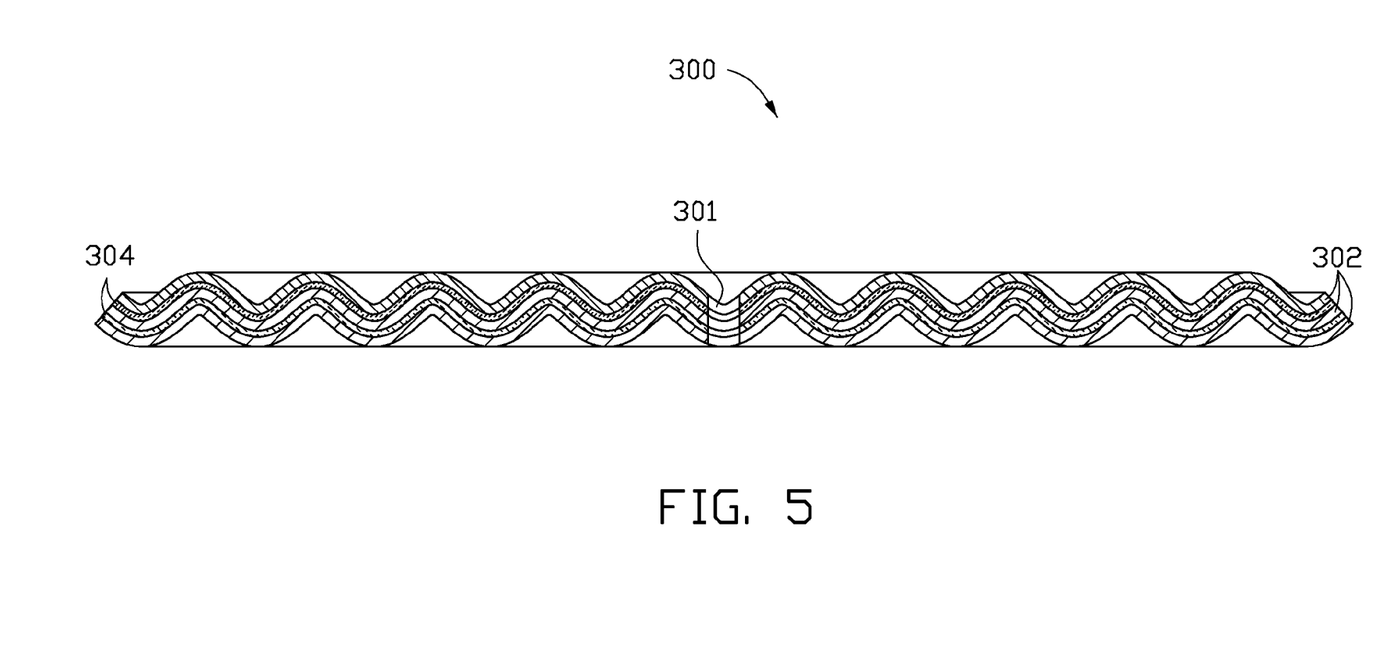
FIG. 5 is a cross-sectional view of a third embodiment of a damper.

A third embodiment of a damper 300 is illustrated in FIG. 5. The damper 300 comprises a matrix 302 and at least two carbon nanotube structures 304 located in the matrix 302 to form a composite structure. A through hole 301 is defined in a center of the damper 300.

The structure of the damper 300 is similar to the structure of the damper 100 in the first embodiment, except that the damper 300 comprises at least two stacked carbon nanotube structures 304 spaced apart from each other. The carbon nanotube structure 304 can be at least one carbon nanotube film described in the first embodiment, or the plurality of linear carbon nanotube structures described in the second embodiment. The method for making the carbon nanotube structure can include a plurality of hot pressing steps or only one step.

The at least two carbon nanotube structures 304 can be stacked, substantially parallel, or coplanar with each other. In the matrix, the two carbon nanotube structures 304 can be spaced apart from each other or kept close to each other. In one embodiment, the damper 300 comprises two stacked carbon nanotube structures 304 spaced apart, and the matrix is a liquid-state polymer. The method for making the damper 300 includes, step A, locating the two carbon nanotube structure 304 into the liquid-state polymer, and step B, solidifying the liquid-state polymer after the liquid-state polymer soaks the carbon nanotube structures 304. The carbon nanotube structure and the liquid-state polymer can be vacuumized before step B so that the air in the carbon nanotube structure 304 and the liquid-state polymer can be removed and the liquid-state polymer soaks into the gaps between the carbon nanotubes of the carbon nanotube structure 304 adequately.

Figure 6:
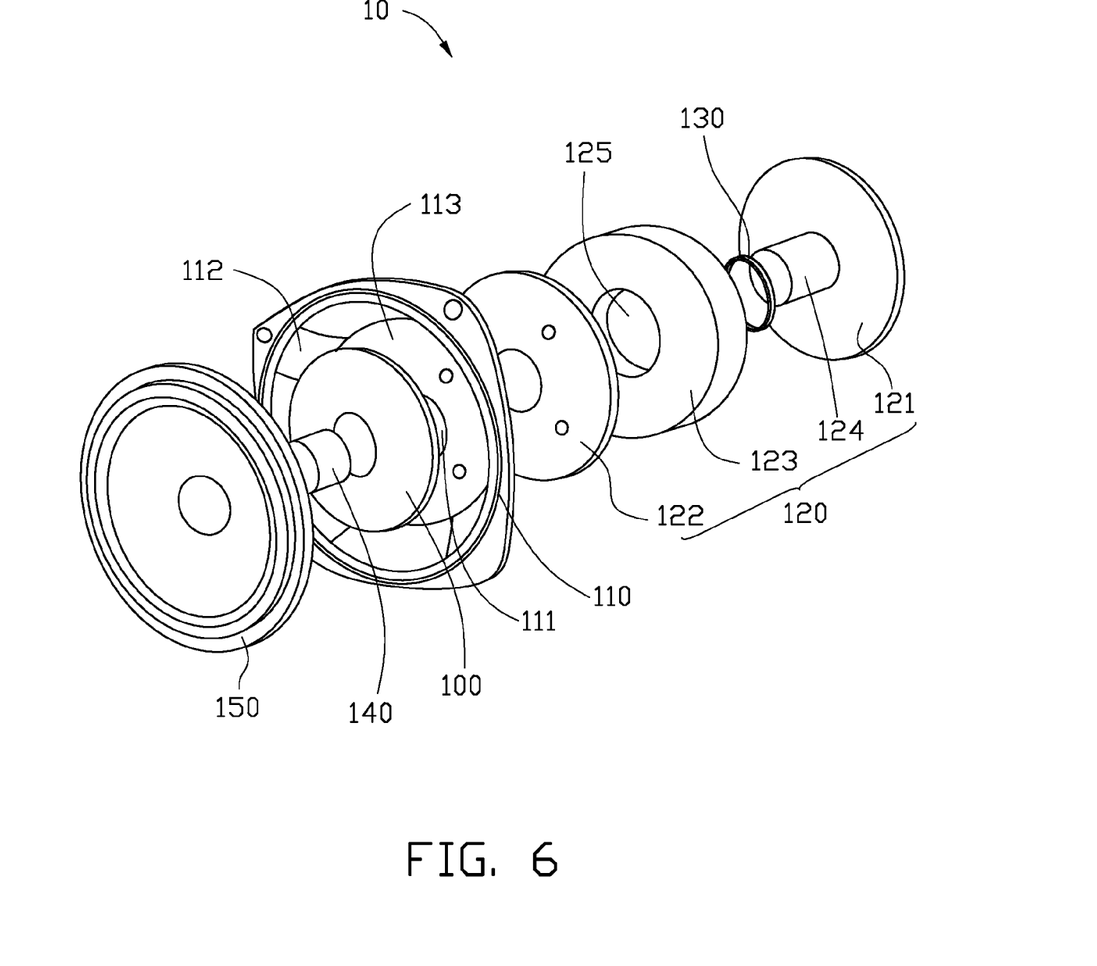
FIG. 6 is an exploded isometric view of one embodiment of a loudspeaker.
Figure 7:
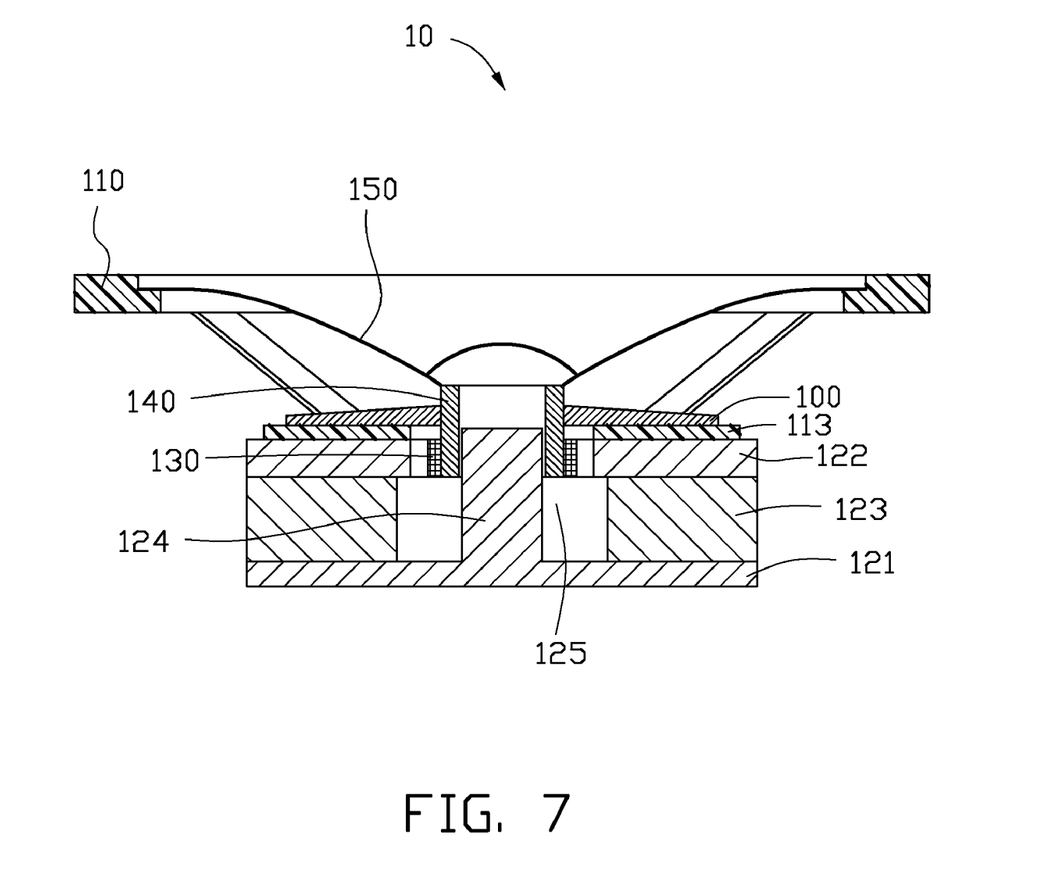
FIG. 7 is a cross-sectional view of the loudspeaker of FIG. 6.

Referring to FIGS. 6 and 7, a loudspeaker 10 of one embodiment includes a frame 110, a magnetic circuit 120, a voice coil 130, a bobbin 140, a diaphragm 150, and a damper 100.

The frame 110 is mounted on an upper side of the magnetic circuit 120. The voice coil 130 is received in the magnetic circuit 120 and wound on the bobbin 140. An outer rim of the diaphragm 150 is fixed to an inner rim of the frame 110, and an inner rim of the diaphragm 150 is fixed to an outer rim of the bobbin 140 placed in a magnetic gap 125 of the magnetic circuit 120.

The frame 110 can be a truncated cone with an opening on one end and includes a hollow cavity 112 and a bottom 113. The hollow cavity 112 receives the diaphragm 150 and the damper 100. The bottom 113 has a center hole 111 to accommodate a center pole 124 of the magnetic circuit 120. The bottom 113 of the frame 110 is fixed to the magnetic circuit 120.

The magnetic circuit 120 includes a lower plate 121 having the center pole 124, an upper plate 122, and a magnet 123 sandwiched by the lower plate 121 and the upper plate 122. The upper plate 122 and the magnet 123 can be both substantially circular, and define a cylindrical space in the magnetic circuit 120. The center pole 124 is received in the space and extends through the center hole 111. The magnetic gap 125 is formed between the center pole 124 and the magnet 123. The magnetic circuit 120 is fixed on the bottom 113 at the upper plate 122.

The voice coil 130 is a driving member of the loudspeaker 10. The voice coil 130 is made of conducting wire. When electric signals are inputted to the voice coil 130, a magnetic field is formed by the voice coil 130 that varies with variations in the electric signals. The interaction of the magnetic field of the voice coil 130 and the magnetic circuit 120 induces the voice coil 130 to vibrate.

The bobbin 140 is light in weight and has a hollow structure. The center pole 124 is disposed in the hollow structure and spaced from the bobbin 140. When the voice coil 130 vibrates, the bobbin 140 and the diaphragm 150 also vibrate with the voice coil 130 to produce pressure waves heard as sound.

The diaphragm 150 has a funnel configuration and is a sound producing member of the loudspeaker 10. The diaphragm 150 can have a conical shape if used in a large loudspeaker 10. If the loudspeaker 10 is small, the diaphragm 150 can have a round or rectangular planar shape.

The diaphragm 150 is held mechanically by the damper 100. The damper 100 is fixed to the frame 110 and the bobbin 140. The damper 100 allows the voice coil 130 to freely move up and down but not left and right, so that the loudspeaker 10 can have good mechanical strength and a good electroacoustical characteristic. The damper 100 can also be of the second and third embodiments of the damper 200, 300.

An external input terminal can be attached to the frame 110. A dust cap (not shown) can be fixed over and above a joint portion of the diaphragm 150 and the bobbin 140.

It is to be understood that, the loudspeaker 10 is not limited to the above-described structure. Any loudspeaker of any size and shape using the present damper 100, 200, 300 is in the scope of the present disclosure.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. A damper comprising:
a matrix; and
a carbon nanotube structure disposed in the matrix.

2. The damper of claim 1, wherein the damper is a corrugated sheet having alternating circular ridges and circular furrows.

3. The damper of claim 2, wherein a through hole is defined at a center of the sheet.

4. The damper of claim 1, wherein the carbon nanotube structure comprises a plurality of carbon nanotubes; a plurality of gaps is defined by the plurality of carbon nanotubes; the matrix is filled in the gaps.

5. The damper of claim 1, wherein the carbon nanotube structure comprises a plurality of carbon nanotubes, and surfaces of the plurality of carbon nanotubes are covered by the matrix.

6. The damper of claim 1, wherein the carbon nanotube structure comprises a plurality of layer-shaped carbon nanotube structure stacked or spaced apart from each other.

7. The damper of claim 1, wherein the carbon nanotube structure comprises at least one carbon nanotube film, at least one linear carbon nanotube structure, or combinations thereof.

8. The damper of claim 7, wherein the carbon nanotube structure comprises a plurality of stacked carbon nanotube films.

9. The damper of claim 7, wherein the carbon nanotube structure comprises at least one carbon nanotube film comprising a plurality of successive carbon nanotubes joined end to end by van der Waals attractive force therebetween, and the carbon nanotubes are arranged substantially along the same direction.

10. The damper of claim 7, wherein the carbon nanotube structure comprises at least one carbon nanotube film comprising a plurality of carbon nanotubes entangled with each other.

11. The damper of claim 7, wherein the carbon nanotube structure comprises a plurality of linear carbon nanotube structures substantially parallel to each other, crossed with each other, or woven together.

12. The damper of claim 7, wherein the carbon nanotube structure comprises a single linear carbon nanotube structure folded or wound to form a plane structure.

13. The damper of claim 7, wherein the carbon nanotube structure comprises at least one linear carbon nanotube structure comprising at least one untwisted carbon nanotube wire, at least one twisted carbon nanotube wire, or combinations thereof.

14. The damper of claim 1, wherein the matrix is a polymer film, a paper, a metal film or a metal sheet.

15. A damper comprising:
a matrix having radially alternating ridges and furrows; and
a carbon nanotube structure disposed in the matrix.

16. A loudspeaker comprising:
a frame;
a magnetic circuit defining a magnetic gap, the magnetic circuit being mounted on the frame;
a bobbin located in the magnetic gap; and
a damper having ridges and furrows thereon and defining a through hole therein, an outer rim of the damper being fixed to the frame, an inner rim of the damper being fixed to the bobbin;
wherein the damper comprises a matrix and a carbon nanotube structure disposed in the matrix.

17. The loudspeaker of claim 16, wherein the damper is a corrugated round sheet having alternating circular ridges and circular furrows.

18. The loudspeaker of claim 17, wherein a through hole is defined at a center of the round sheet.

19. The loudspeaker of claim 16, wherein the carbon nanotube structure comprises a carbon nanotube film, a linear carbon nanotube structure, or combinations thereof.

20. The loudspeaker of claim 19, wherein the carbon nanotube structure comprises at least one carbon nanotube film comprising a plurality of successive carbon nanotubes joined end to end by van der Waals attractive force therebetween, and the carbon nanotubes are arranged substantially along the same direction.

* * * * *